(12) United States Patent

Sasaki

(10) Patent No.: US 12,657,488 B2
(45) Date of Patent: Jun. 16, 2026

(54) INFORMATION PROCESSING APPARATUS, INFORMATION PROCESSING METHOD, AND COMPUTER READABLE RECORDING MEDIUM

(71) Applicant: NEC Corporation, Tokyo (JP)

(72) Inventor: Yoichi Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1019 days.

(21) Appl. No.: 17/771,890

(22) PCT Filed: Nov. 1, 2019

(86) PCT No.: PCT/JP2019/042986

§ 371 (c)(1),
(2) Date: Apr. 26, 2022

(87) PCT Pub. No.: WO2021/084733

PCT Pub. Date: May 6, 2021

(65) Prior Publication Data

US 2022/0391728 A1 Dec. 8, 2022

(51) Int. Cl.
*G06N 5/04* (2023.01)
*G06N 5/025* (2023.01)

(52) U.S. Cl.
CPC ............. *G06N 5/041* (2013.01); *G06N 5/025* (2013.01)

(58) Field of Classification Search
None
See application file for complete search history.

(56) References Cited

U.S. PATENT DOCUMENTS

2009/0158286 A1* 6/2009 Carteri .................. G06F 9/5038
718/102

FOREIGN PATENT DOCUMENTS

| JP | 2016-091039 A | 5/2016 |
| JP | 2019-153047 A | 9/2019 |
| WO | 2019/138458 A1 | 7/2019 |

OTHER PUBLICATIONS

Inoue et al ("ILP-Based Reasoning for Weighted Abduction" 2011) (Year: 2011).*
Areces ("Modal Satisfiability via SMT Solving" 2015) (Year: 2015).*
International Search Report for PCT Application No. PCT/JP2019/042986, mailed on Dec. 24, 2019.
(Continued)

*Primary Examiner* — Lut Wong
(74) *Attorney, Agent, or Firm* — Sughrue Mion, PLLC

(57) ABSTRACT

The information processing apparatus 1 includes the input unit 101 that receives observation represented by a conjunction of atomic formulas, background knowledge represented by a set of logic formulas, and condition to be satisfied by a new rule represented by a logic formula; the rule candidate generation unit 102 that generates the new rule represented by a logic formula having a predicate, which is contained in the observation or the background knowledge, as an element; the abduction system unit 103 that executes abduction to derive best hypothesis by using the background knowledge, to which the new rule generated is added, and the observation as inputs; and the rule evaluation unit 104 that evaluates whether the new rule satisfies the condition to be satisfied by using the best hypothesis.

9 Claims, 7 Drawing Sheets

(56)  References Cited

OTHER PUBLICATIONS

Muggleton, S.H. "Inductive logic programming". New Generation Computing. 8 (4): pp. 295-318. 1991.

J. Rissanen, "Modeling by shortest data description," Automatica, vol. 14, No. 5, pp. 465-471, Sep. 1798.

L. De Raedt and K. Kersting. "Probabilistic Logic Learning," ACM-SIGKDD Explorations: Special issue on Multi-Relational Data Mining, 5 (1): pp. 31-48. 2003.

Naoya Inoue, Kentaro Inui,"ILP-Based Reasoning for Weighted Abduction," Plan, Activity, and Intent Recognition 2011, pp. 1-9.

Kazeto Yamamoto, Naoya Inoue, Kentaro Inui, Yuki Arase and Jun'ichi Tsujii. "Boosting the Efficiency of First-order Abductive Reasoning Using Pre-estimated Relatedness between Predicates," International Journal of Machine Learning and Computing, vol. 5, No. 2, pp. 114-120. Apr. 2015.

English translation of Written opinion for PCT Application No. PCT/JP2019/042986, mailed on Dec. 24, 2019.

JP Office Action for JP Application No. 2021-554022, mailed on May 9, 2023 with English Translation.

Inoue, Naoya et al., ILP-Based Reasoning for Weighted Abduction, workshop technical report on Plan, Activity, and Internet Recognition of Twenty-Fifth AAAI Conference on Artificial Intelligence, AAAI [online], 2011. 08 [retrieved on Dec. 2, 2019], Retrieved from the Internet <URL:https://aaai.org/ocs/index.php/WS/AAAIW11/paper/view/3999/4313>, pp. 25-32.

* cited by examiner

INFORMATION PROCESSING APPARATUS, INFORMATION PROCESSING METHOD, AND COMPUTER READABLE RECORDING MEDIUM

CROSS REFERENCE TO RELATED APPLICATIONS

This application is a National Stage of Application No. PCT/JP2019/042986 filed Nov. 1, 2019 the disclosure of which is incorporated herein in its entirety by reference.

TECHNICAL FIELD

The present invention relates to an information processing apparatus, an information processing method and a computer-readable recording medium for discovering a rule based on inductive logic programming thinking using an index of abduction.

BACKGROUND ART

As a typical method for rule discovery, the Inductive Logic Programming (ILP) described in Non-Patent Document 1 is a machine learning method based on logic programming. In this method, given an observation, from the fact contained in the pre-prepared background knowledge (KB), a rule that should be supplemented to explain the case using rules contained in the "KB" is discovered. More specifically, for background knowledge B represented by a set of logic formulas as input and an observation "ε" represented by a conjunction (or set) of atomic formulas, a set of logic formulas Σ satisfying ΣUB⊨C for all C∈ε is output. In the background knowledge "B", a logic formula composed of one atomic formula (grounded atomic formula) having no variable as an argument is called a fact, and the others are called rules.

For example, "B={parent (x, y):-father (x, y), parent (x, y):-mother (x, y), father (Taro, Ichiro), mother (Yoshiko, Kenta), sister (Hanako, Taro), sister (Keiko, Yoshiko), sister (Fumie, Yoshiko)}", and "ε={aunt (Hanako, Ichiro), aunt (Keiko, Kenta), aunt (Fumie, Kenta)}", then "Σ={aunt (x, y):-sister (x, z) A parent (z, y)}" can be discovered. Here, {father (Taro, Ichiro), mother (Yoshiko, Kenta), sister (Hanako, Taro), sister (Keiko, Yoshiko), sister (Fumie, Yoshiko)} is a fact and {parent (x, y):-father (x, y), parent (x, y):-mother (x, y)} is a rule.

The minimum description length principle (MDL) described in Non-Patent Document 2 and the probabilistic inductive logic programming in consideration of probabilistic factors described in Non-Patent Document 3 have been proposed as criteria for evaluating the quality of the discovered rule.

LIST OF RELATED ART DOCUMENTS

Non-Patent Document

Non-Patent Document 1: Muggleton, S. H. "Inductive logic programming". New Generation Computing. 8 (4): pp. 295-318. 1991.

Non-Patent Document 2: J. Rissanen, "Modeling by shortest data description," Automatica, vol. 14, no.5, pp. 465-471, September 1798.

Non-Patent Document 3: L. De Raedt and K. Kersting. "Probabilistic Logic Learning," ACM-SIGKDD Explorations: Special issue on Multi-Relational Data Mining, 5 (1): pp31-48, 2003

Non-Patent Document 4: Naoya Inoue, Kentaro Inui, "ILP-Based Reasoning for Weighted Abduction," Plan, Activity, and Intent Recognition 2011

Non-Patent Document 5: Kazeto Yamamoto, Naoya Inoue, Kentaro Inui, Yuki Arase and Jun'ichi Tsujii. "Boosting the Efficiency of First-order Abductive Reasoning Using Pre-estimated Relatedness between Predicates," International Journal of Machine Learning and Computing, Vol. 5, No. 2, pp. 114-120. April 2015.

SUMMARY OF INVENTION

Problems to be Solved by the Invention

The inductive logic programming described above can be expected to be able to discover an appropriate rule necessary to lead a given case when there are many facts in the background knowledge. On the other hand, if there are few facts, it is difficult to discover the rule. When considering industrial applications using actual data, not only when the rules are not sufficient, but also when the facts are not sufficient easily occur, a rule discovery technology that can be realized even in such cases is required.

An example of object of the present invention is to provide an information processing apparatus, an information processing method and a computer-readable recording medium that can solve the above-mentioned problems by discovering rules from background knowledge and given cases.

Means for Solving the Problems

In order to achieve the above object, an information processing apparatus in one aspect of the present invention includes:

an input unit that receives observation represented by a conjunction of atomic formulas, background knowledge represented by a set of logic formulas, and condition to be satisfied by a new rule represented by a logic formula, a rule candidate generation unit that generates the new rule represented by a logic formula having a predicate, which is contained in the observation or the background knowledge, as an element, an abduction system unit that executes abduction to derive best hypothesis by using the background knowledge, to which the new rule generated is added, and the observation as inputs, and a rule evaluation unit that evaluates whether the new rule satisfies the condition to be satisfied by using the best hypothesis.

Further, in order to achieve the above object, an information processing method in one aspect of the present invention includes:

receiving observation represented by a conjunction of atomic formulas, background knowledge represented by a set of logic formulas, and condition to be satisfied by a new rule represented by a logic formula, generating the new rule represented by a logic formula having a predicate, which is contained in the observation or the background knowledge, as an element, executing abduction to derive best hypothesis by using the background knowledge, to which the new rule generated is added, and the observation as inputs, and evaluating whether the new rule satisfies the condition to be satisfied by using the best hypothesis.

Further, in order to achieve the above object, a computer-readable recording medium in one aspect of the present invention includes a program recorded thereon, the program including instructions that cause a computer to execute:

receiving observation represented by a conjunction of atomic formulas, background knowledge represented by a set of logic formulas, and condition to be satisfied by a new rule represented by a logic formula, generating the new rule represented by a logic formula having a predicate, which is contained in the observation or the background knowledge, as an element, executing abduction to derive best hypothesis by using the background knowledge, to which the new rule generated is added, and the observation as inputs, and evaluating whether the new rule satisfies the condition to be satisfied by using the best hypothesis.

The Inductive Logic Programming on Abduction (ILP-Ab) and Abduction, which are targeted by the information processing apparatus that discover rules, will be described below.

The abduction is inference to discover the best explanation for a given observation. In the formulation, given background knowledge "B" represented by a set of logic formulas and an observation "O" represented by a conjunction of atomic formulas as inputs, the best hypothesis $H_{best}$, which is represented by a conjunction of atomic formulas and satisfy the following equation, is output.

Best Hypothesis $H_{best} =$ [Eq. 1]

$$\arg\max_{H\in\mathcal{H}} Eval(H) \text{ s.t. } H = \{H \mid B \cup H \mid = O, B \cup H \mid \neq \bot\}$$

Eval (H) represents a evaluation function for hypothesis H. e.g.) Weighed Abduction, Etcetra Abduction.etc For example, it is written as follows: background knowledge B={∀x, dog (x)⇒animal (x), animal (John)}, observation O=animal (John) ∧ bark (John).

In the general abduction, a hypothesis is generated based on the following backward reasoning operation and a unification operation. In the backward reasoning operation, the rule is applied in the opposite direction to any candidate hypothesis H. For example, when H=p(x1, x2)\$2 ∧ q(x2)\$1, r(x1)\$3 ∧ s(y)\$4⇒p(x1, x2)∈B, H'=r(x1)\$6 ∧ s(y)\$8 ∧ q(x2)\$1.

In the unification operation, when the types of predicates are the same, only the cost of the predicate having a small cost is adopted by making the variables of the arguments of the predicates the same. For example, the result of executing the unification operation on "H=p(x)\$2 ∧ p(y)\$3 ∧ q(x)\$5" is "H'=p(x)\$2 ∧ q(x)\$5 (where x=y)".

The evaluation function called Weighted Abduction (WA) is explained here. Each atomic formula contained in the antecedent in each rule of the background knowledge "KB" is assigned with a weight "wi" (1≤i≤k) such that "∀x∃p1 (x1)w1 ∧ p2(x2)w2 ∧ . . . . ∧ pk(xk)wk⇒q(x0,y)". Here, regarding the rule "A ∧ B→C", "A ∧ B" is called the antecedent and "C" is called the consequent. Similarly, the observation is represented by a conjunction of atomic formula assigned with cost ci(1≤i≤k), such that "p1(x1)\$c1 ∧ p2(x2)\$c2 ∧ . . . . ∧pk(xk)\$ck". "WA" is the problem of discovering the best hypothesis that minimizes "c(H)=Σ_{p (x)\$w∈H} w" among the hypothesis H, given background knowledge "B" and observation "O" as input. Hereafter, for the sake of explanation, the abduction system is assumed to be "WA" unless otherwise specified, but the present invention is not limited to "WA".

Next, the inductive logic programming on abduction (ILP-Ab) is formulated. Conventional inductive logic programming is a method of discovering the rule necessary to explain an observation from the facts in the "KB". In contrast, the ILP-Ab proposed here is a method for discovering the rule necessary to improve a hypothesis when constructing the hypothesis to explain an observation. This method is expected to discover appropriate rules even when the number of facts in the "KB" is small.

In the "ILP-Ab", given as input the background knowledge "B" represented by a set of weighted logic formulas, an observation "O" represented by a conjunction of weighted atomic formulas, and a threshold value "σ", a rule represented by a logic formula satisfying the condition "|Eval_best (B ∧ r, O)–Eval_best (B, O)|≥σ" is output. Here, "Eval_best (B, O)" is the evaluation function value for the best hypothesis derived by abduction with background knowledge "B" and observation "O" as inputs.

Advantageous Effects of the Invention

According to the rule discovery information processing apparatus and information processing method described above, rule discovery can be performed even when the number of facts in the knowledge database is small, and rule discovery can be performed relatively efficiently.

EXAMPLE EMBODIMENTS

Hereinafter, the example embodiments of the present invention will be described in detail exemplary with reference to the drawings. However, the constituent elements described in the following example embodiments are merely examples, and the technical scope of the present invention is not intended to be limited thereto.

First Example Embodiment

Figure 1:
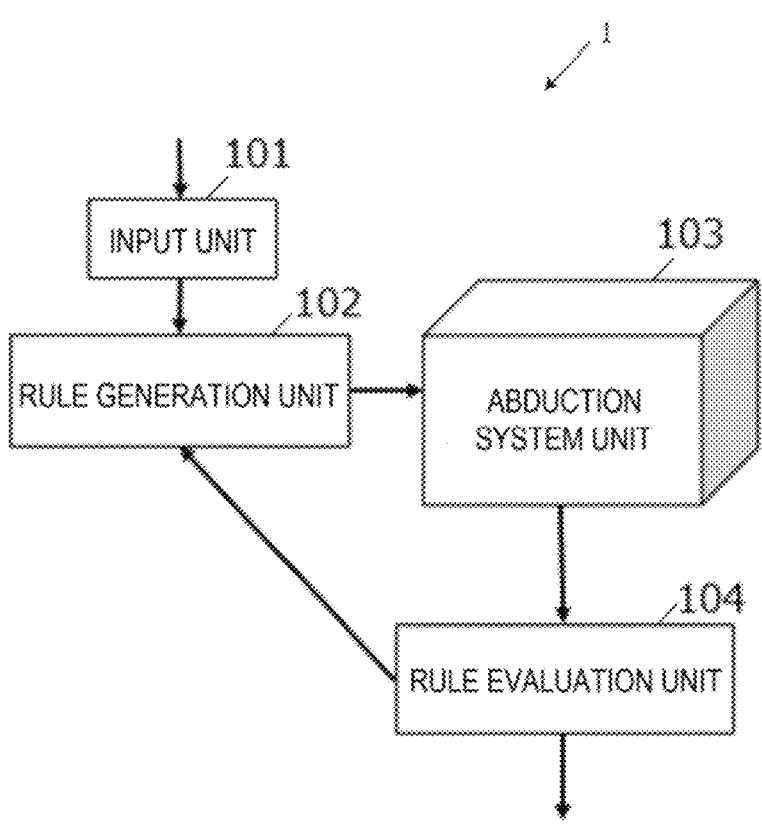
FIG. 1 is a schematic block diagram showing a functional configuration of the rule discovery information processing apparatus according to the first example embodiment.

The information processing method as the first example embodiment of the present invention will be described with reference to FIG. 1, which represents a schematic block diagram. As shown in FIG. 1, the rule discovery information processing apparatus 1 includes an input unit 101, a rule generation unit 102, an abduction system unit 103, and a rule evaluation unit 104.

The input unit 101 receives background knowledge "B" represented by a set of logic formulas, observation "O" represented by a conjunction of atomic formulas, and condition to be satisfied by a new rule represented by a logic formula (here, the threshold value "σ"), which are inputs necessary for executing ILP-Ab. Here, the threshold value "σ" represents the degree of contribution to improvement for the best hypothesis inferred from new background knowledge, which obtained by adding the target rule to background knowledge. Therefore, if the threshold value "σ" is increased, the number of discovered rules is reduced, and only the rules with a high contribution to improvement are output.

The rule generation unit 102 generates a new rule that can be considered as a rule to be added. Here, a rule, which can be generated by a combination of atomic formulas each having predicate contained in observation or background knowledge as an element, is considered. However, the added rule can be considered within an arbitrary setting range by the user, and is not limited to the above-mentioned rule generation range.

The abduction system unit 103 executes abduction to derive the best hypothesis by using the new background knowledge, to which the new rule generated by the rule generation unit 102 is added, and observation as inputs. It is noted that the abduction system unit 103 can use any abduction system (inference system that executes general abduction) and is not limited.

The rule evaluation unit 104 evaluates whether the new rule satisfies the condition to be satisfied by using the best hypothesis. Specifically, the rule evaluation unit 104 evaluates the quality of the rule from the inference result output by the abduction system unit 103 using an index based on the threshold value "σ" received by the input unit 101, and outputs a rule that satisfies the condition.

It will be shown in Examples that the ILP-Ab according to the present invention can be expected to discover an appropriate rule as compared with the ILP even when the facts contained in the background knowledge are few.

Example 1

Background knowledge "B={murderer (x)→shoot a person (x), policeman (x)→shoot a person (x), murderer (x)→blood adheres (x), policeman (x)→ in a police box (x)}", and "observation=having a gun (Yamada) ∧ blood adhered (Yamada) ∧ having a gun (Sato) ∧ in a police box (Sato)" is given. For simplicity, it is assumed that the antecedent weights of the rules in the "B" are all "1". It should be noted here that the background knowledge "B" does not contain any facts and is composed only of rules. The rules derived by the ILP are evaluated based on the index of MDL described above. It is represented by "MDL (R)=n", where "n" is the number of atomic formulas contained in the rule set "R" to be added. Many miscellaneous rules such as {having a gun (Yamada) ∧ blood adheres (Yamada) ∧ having a gun (Sato) ∧ in a police box (Sato)}, {having a gun (Yamada) ∧ blood adheres (Yamada) ∧ having a gun (Sato) ∧ policeman (Sato)}, {(shoot a person (x)→having a gun (x)) ∧ blood adheres (Yamada) ∧ having a gun (Sato)) ∧ in a police box (Sato)}, and {(shoot a person (x)→having a gun (x)) ∧ blood adheres (Yamada) ∧ having a gun (Sato) ∧ policeman (Sato)}. This is because there are no facts in the background knowledge, so all possible facts are listed. On the other hand, ILP-Ab outputs only the rule that means (shoot a person (x)→having a gun (x)).

Figure 2:
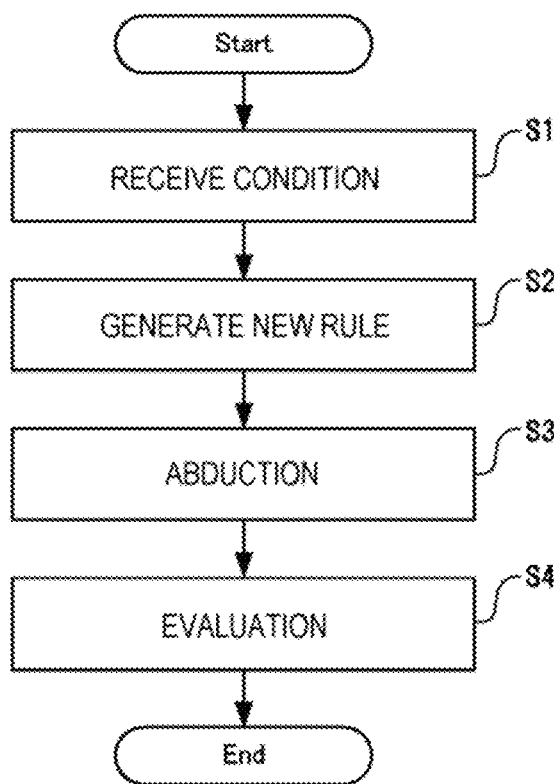
FIG. 2 is a flowchart showing the procedure of the information processing method according to the first example embodiment.

FIG. 2 is a flowchart showing the procedure of the information processing method according to the first example embodiment.

First, the background knowledge "B" represented by a set of logic formulas, the observation "O" represented by the conjunction of atomic formulas, and the threshold value "σ", which are inputs necessary for executing ILP-Ab, are received (S1). Next, a rule that can be considered as a rule to be added is generated (S2). Subsequently, abduction to derive the best hypothesis is executed by using the new background knowledge, to which the new rule generated in "S2" is added, and observation as inputs (S3). Then, the quality of the rule is evaluated from the inference result output in "S3" using an index based on the threshold value "σ" received in "S1", and the rule satisfying the condition is output (S4).

Second Example Embodiment

Figure 3:
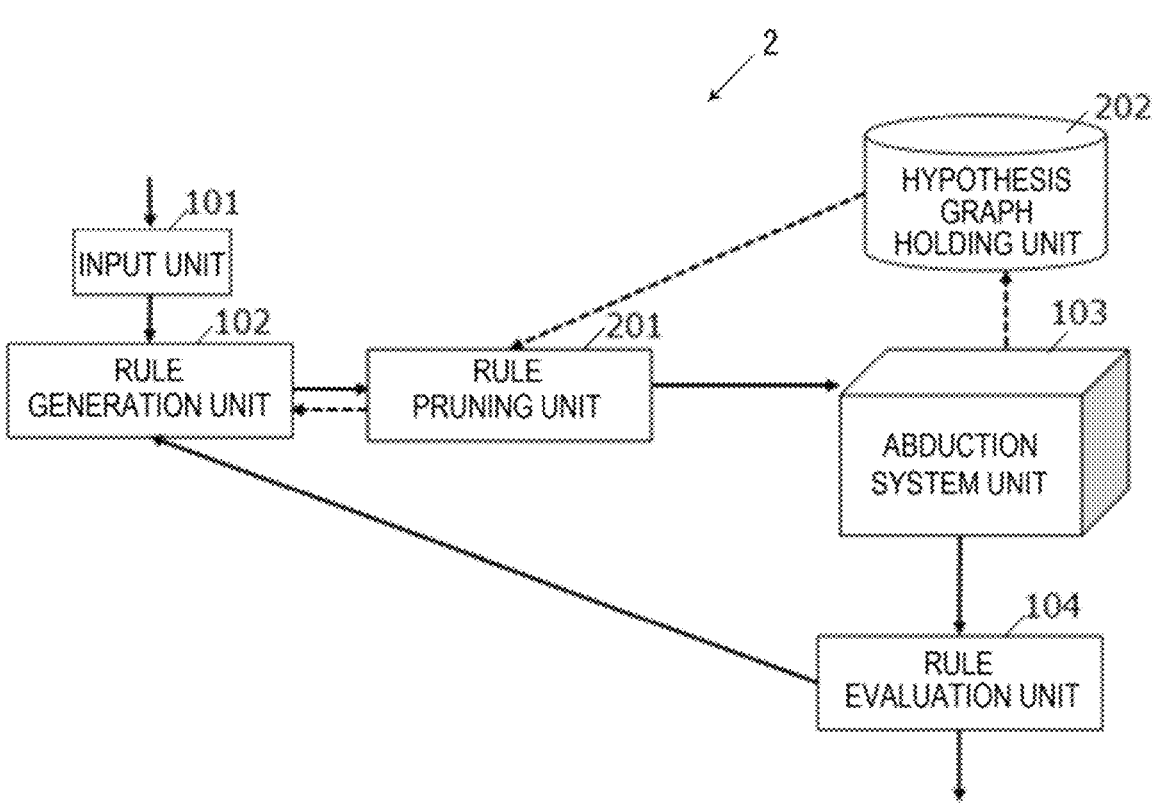
FIG. 3 is a schematic block diagram showing a functional configuration of the rule discovery information processing apparatus according to the second example embodiment.

The information processing method as the second example embodiment of the present invention will be described with reference to FIG. 3, which represents a schematic block diagram. As shown in FIG. 3, the rule discovery information processing apparatus 2 includes a rule pruning unit 201 and a hypothesis graph holding unit 202 in addition to the input unit 101, the rule generation unit 102, the abduction system unit 103, and the rule evaluation unit 104 that constitute the first example embodiment.

Figure 4:
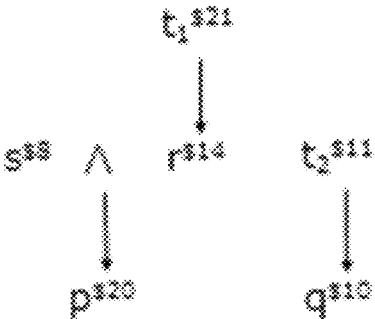
FIG. 4 is an example of the generated hypothesis graph.

The abduction system unit 103 may be any inference system that generates a hypothesis graph based on the above-described non-patent document 4, and is not limited to any other. Here, the hypothesis graph is represented by a directed hypergraph "G=(P,R)=(P(i),R(i))_{i=0 . . . d}", where each node p∈P corresponds to an atomic formula and each edge r∈R corresponds to a rule. First, for observation "O=p1(x1) ∧ . . . . ∧ pk(xk)", "P(0)={a1, . . . ak}" is generated. Here, a1, . . . ak represent the nodes corresponding to p1(x1), . . . , pk(xk), respectively. Next, the following operations are performed for i=1, . . . , d. For a rule "p1(x1 ∧ . . . . ∧ pk(xk)→qk(xk)∈B", if node β∈P(i−1) corresponding to qk(xk) exists, new nodes β1, . . . , βk are generated and added to P(i), and new edges ({β1, . . . , βk}, β) are added to R(i). As an example, FIG. 4 shows a hypothesis graph generated for background knowledge "B={s0.4 ∧ r0.7→p, t1.5→r, t1.1→q}" and observation "O=p$20 ∧ q$10".

The rule pruning unit 201 determines to skip abduction to be executed with the background knowledge, to which the new rule is added, and the observation as inputs, by using a prior hypothesis graph generated when abduction is executed with the background knowledge, to which a rule having fewer logic formulas of conjunction than the new rule is added, and the observation as inputs. Specifically, the rule pruning unit 201 determines whether or not to add the rules generated by the rule generation unit based on information obtained from the structure of the hypothesis graph held by the hypothesis graph holding unit 202 to the input to the abduction system section 103. More specifically, two pruning conditions are given.

The first condition to be introduced is that the predicate constituting the atomic formula corresponding to the node of the hypothesis graph must be contained in the consequent of the rule to be added, due to the backward reasoning operation nature of the abduction operation.

Figure 5:
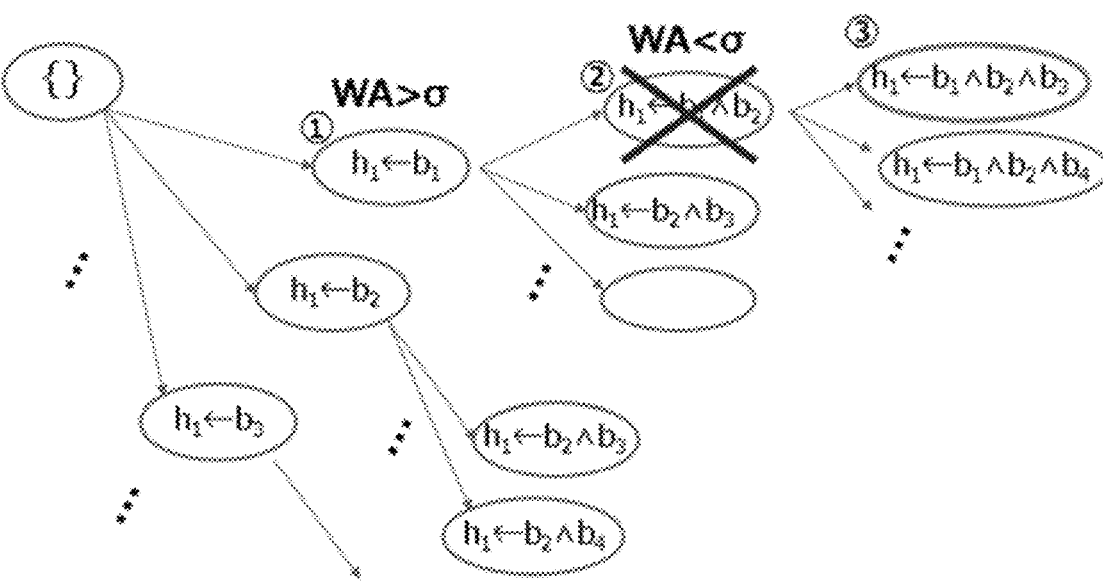
FIG. 5 is a search tree for incrementally executing rule addition.

In the second condition, the nature that if "|Eval_best (B Λ r_k−1, O)−Eval_best (B, O)|<σ" is true for the rule "r_k:h+b←1 Λ . . . . Λ b_k" and "v∈R_k" does not have a potential to be unified, "|Eval_best (B Λ r_k, O)−Eval_best (B, O)|<σ" becomes true and "r_k" is not output, is used. Here, as shown in FIG. 5, "R_k" means the predicate set of atomic formulas contained in the subgraph that can be generated with "b_k" as a root on the new hypothesis graph with an edge generated from "h" in the hypothesis graph when the rule "r_k" is added. "Eval_best (B Λ r_k−1, O)" and "Eval_best (B, O)" can be calculated at no cost because the results of the previous stage can be used. Regarding the potential of unification of "v∈R_k", the information of the predicate in the atomic formula that can be generated by applying the rule backward to v based on the rule contained in the background knowledge "B" in advance is held. For example, distance information between the predicates described in Non-Patent Document 5 can be used.

The hypothesis graph holding unit 202 holds a hypothesis graph, having a graph representing which represents a set of possible hypotheses and has nodes corresponding to predicates, generated prior to execution of abduction by the abduction system unit 203. Specifically, the hypothesis graph holding unit 202 holds the information of the hypothesis graph generated when abduction is executed. The hypothesis graph holding unit 202 may hold the hypothesis graph itself, or may hold only the information used in the condition part in the rule pruning unit 201.

Example 2

Figure 6:
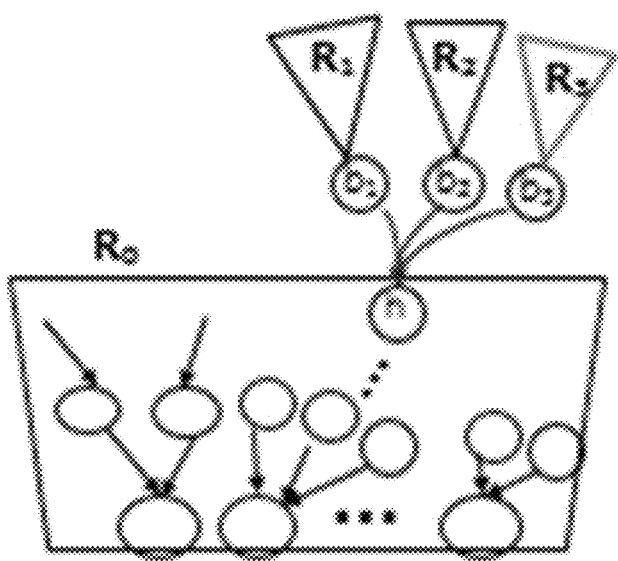
FIG. 6 is a schematic diagram showing a hypothesis graph corresponding to an example.

In this example, an operation example in the rule pruning unit 201 included in the information processing apparatus 2 according to the second example embodiment will be described with reference to FIGS. 5 and 6.

FIG. 5 shows a search tree, and each node on the search tree represents a rule under consideration of the necessity of addition. New rules are generated in the order of (1), (2), and (3) (circled numbers in FIG. 5) in FIG. 5. In naive, for each node, the abduction system operates for new background knowledge obtained by adding the rule considered in each node to the background knowledge. This corresponds to the method of the first example embodiment.

When "h1←b1 Λ b2 Λ b3" is taken into consideration, that is, when the rule at the node (3) is taken into consideration, it can be seen that the rule of "h1←b1 Λ b2" does not satisfy the condition as an output solution. FIG. 6 shows the corresponding hypothesis graph. If the subgraph "R3" newly generated from the new atomic formula "b3" does not have any predicates contained in the "R0", "R1", or "R2", the unification operation is not executed. Therefore, the evaluation function does not improve. Therefore, the following rule may be considered without operating the abduction system for the background knowledge to which "h1←b1 Λ b2 Λ b3" is added.

[Program]

It is sufficient for the program according to the example embodiments of the present invention to be a program that causes a computer to execute steps S1 to S4 shown in FIG. 2. The information processing apparatus and the information processing method according to the example embodiments can be realized by installing this program in the computer and executing this program. In this case, a processor of the computer functions as the input unit 101, the rule generation unit 102, the abduction system unit 103, and the rule evaluation unit 104, and performs processing.

Also, the program according to the example embodiments may be executed by a computer system constituted by a plurality of computers. In this case, for example, each computer may function as any of the input unit 101, the rule generation unit 102, the abduction system unit 103, and the rule evaluation unit 104.

[Physical Configuration]

Figure 7:
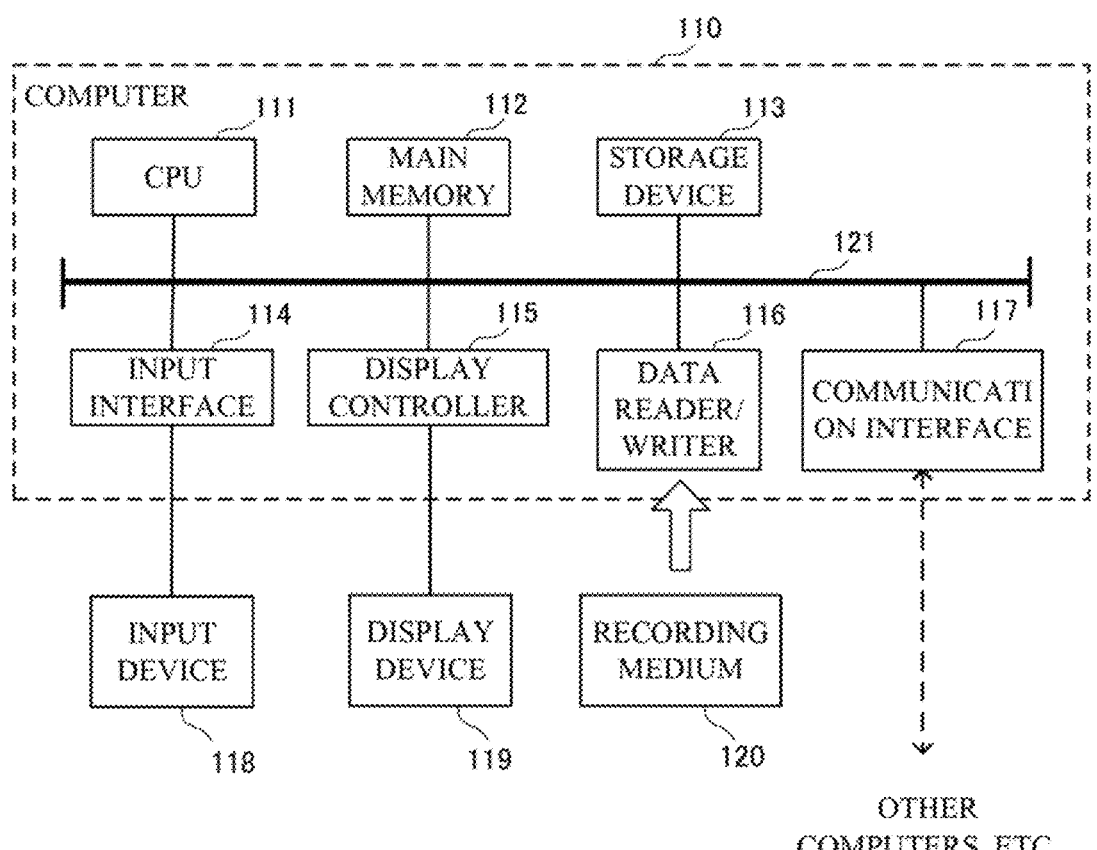
FIG. 7 is a block diagram showing an example of a computer that realizes the information processing apparatuses according to the example embodiments.

Here, a computer that realizes the information processing apparatus by executing the programs in the example embodiment will be described with reference to the drawing. FIG. 7 is a block diagram showing an example of a computer that realizes the information processing apparatuses according to the example embodiments.

As illustrated in FIG. 7, a computer 110 includes a CPU (Central Processing Unit) 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a GPU (Ggraphics Processing Unit) or a FPGA (Field-Programmable Gate Array) in addition to the CPU 111 or in place of the CPU 111.

The CPU 111 loads the program (code) in the example embodiment, which is stored in the storage device 113, onto the main memory 112, and performs various computations by executing the program in a predetermined order. The main memory 112 is typically a volatile storage device such as a DRAM (Dynamic Random Access Memory). Furthermore, the program in the example embodiment is provided in a state such that the program is stored in a computer readable recording medium 120. Note that the program in the example embodiment may also be program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as CF (CompactFlash (registered trademark)) or SD (Secure Digital), a magnetic recording medium such as a flexible disk, and an optical recording medium such as a CD-ROM (Compact Disk Read Only Memory).

Note that the information processing apparatus in the example embodiment can also be realized by using pieces of hardware corresponding to the respective units, rather than using a computer on which the program is installed. Furthermore, a portion of the information processing apparatus may be realized by using a program, and the remaining portion of the information processing apparatus may be realized by using hardware.

While a part of or the entirety of the above-described example embodiment can be expressed by (Supplementary Note 1) to (Supplementary Note 12) described in the following, the invention is not limited to the following description.

(Supplementary Note 1)

An information processing apparatus comprising:

an input unit that receives observation represented by a conjunction of atomic formulas, background knowledge represented by a set of logic formulas, and condition to be satisfied by a new rule represented by a logic formula, a rule candidate generation unit that generates the new rule represented by a logic formula having a predicate, which is contained in the observation or the background knowledge, as an element, an abduction system unit that executes abduction to derive best hypothesis by using the background knowledge, to which the new rule generated is added, and the observation as inputs, and a rule evaluation unit that evaluates whether the new rule satisfies the condition to be satisfied by using the best hypothesis.

(Supplementary Note 2)

The information processing apparatus according to Supplementary note 1, further comprising:

a hypothesis graph holding unit that holds a hypothesis graph generated prior to execution of abduction by the abduction system unit, the hypothesis graph having a graph representing which represents a set of possible hypotheses and has a node corresponding to a predicate, and a rule pruning unit that determines to skip abduction to be executed with the background knowledge, to which the new rule is added, and the observation as inputs, by using a prior hypothesis graph generated when abduction is executed with the background knowledge, to which a rule having fewer logic formulas of conjunction than the new rule is added, and the observation as inputs.

(Supplementary Note 3)

The information processing apparatus according to Supplementary note 2, wherein the rule pruning unit determines to skip abduction when a set of predicates, which are nodes contained in the prior hypothesis graph, does not contain a predicate that appears in a consequent of the new rule.

(Supplementary Note 4)

The information processing apparatus according to Supplementary note 2, wherein the rule pruning unit determines to skip abduction when an evaluation result, evaluated by the rule evaluation unit using a best result derived based on the prior hypothesis graph, does not satisfy the condition and the logic formula of conjunction does not have a potential to be unified with any of the nodes of the prior hypothesis graph.

(Supplementary Note 5)

An information processing method comprising:

a step of receiving observation represented by a conjunction of atomic formulas, background knowledge represented by a set of logic formulas, and condition to be satisfied by a new rule represented by a logic formula, a step of generating the new rule represented by a logic formula having a predicate, which is contained in the observation or the background knowledge, as an element, a step of executing abduction to derive best hypothesis by using the background knowledge, to which the new rule generated is added, and the observation as inputs, and a step of evaluating whether the new rule satisfies the condition to be satisfied by using the best hypothesis.

(Supplementary Note 6)

The information processing method according to Supplementary note 5, further comprising:

a step of holding a hypothesis graph generated prior to execution of abduction, the hypothesis graph having a graph representing which represents a set of possible hypotheses and has a node corresponding to a predicate, and a step of determining to skip abduction to be executed with the background knowledge, to which the new rule is added, and the observation as inputs, by using a prior hypothesis graph generated when abduction is executed with the background knowledge, to which a rule having fewer logic formulas of conjunction than the new rule is added, and the observation as inputs.

(Supplementary Note 7)

The information processing method according to Supplementary note 6, wherein when determining to skip abduction:

determining to skip abduction when a set of predicates, which are nodes contained in the prior hypothesis graph, does not contain a predicate that appears in a consequent of the new rule.

(Supplementary Note 8)

The information processing method according to Supplementary note 6 or 7, wherein when determining to skip abduction:

determining to skip abduction when an evaluation result, evaluated using a best result derived based on the prior hypothesis graph, does not satisfy the condition and the logic formula of conjunction does not have a potential to be unified with any of the nodes of the prior hypothesis graph.

(Supplementary Note 9)

A computer-readable recording medium that includes a program recorded thereon, the program including instructions that cause a computer to execute:

a step of receiving observation represented by a conjunction of atomic formulas, background knowledge represented by a set of logic formulas, and condition to be satisfied by a new rule represented by a logic formula, a step of generating the new rule represented by a logic formula having a predicate, which is contained in the observation or the background knowledge, as an element, a step of executing abduction to derive best hypothesis by using the background knowledge, to which the new rule generated is added, and the observation as inputs, and a step of evaluating whether the new rule satisfies the condition to be satisfied by using the best hypothesis.

(Supplementary Note 10)

The computer-readable recording medium according to Supplementary note 9, the program further includes:

a step of holding a hypothesis graph generated prior to execution of abduction, the hypothesis graph having a graph representing which represents a set of possible hypotheses and has a node corresponding to a predicate, and a step of determining to skip abduction to be executed with the background knowledge, to which the new rule is added, and the observation as inputs, by using a prior hypothesis graph generated when abduction is executed with the background knowledge, to which a rule having fewer logic formulas of conjunction than the new rule is added, and the observation as inputs.

(Supplementary Note 11)

The computer-readable recording medium according to Supplementary note 10, wherein when determining to skip abduction:

determining to skip abduction when a set of predicates, which are nodes contained in the prior hypothesis graph, does not contain a predicate that appears in a consequent of the new rule.

(Supplementary Note 12)

The computer-readable recording medium according to Supplementary note 10 or 11, wherein when determining to skip abduction:

determining to skip abduction when an evaluation result, evaluated using a best result derived based on the prior hypothesis graph, does not satisfy the condition and the logic formula of conjunction does not have a potential to be unified with any of the nodes of the prior hypothesis graph.

INDUSTRIAL APPLICABILITY

As described above, according to the present invention, it is possible to discover rules by combining the framework of abduction and inductive logic programming. This technology targets

INDUSTRIAL APPLICABILITY

As described above, according to the present invention, it is possible to discover rules by combining the framework of abduction and inductive logic programming. This technology targets all systems that incorporate logical reasoning. This technique can be one of the solutions to the problems when the rules are not sufficient, which is one of the problems that have occurred when using the conventional logical reasoning technique.

REFERENCE SIGNS LIST 1,2 Information processing apparatus
101 Input unit
102 Rule generation unit
103 Abduction system unit
104 Rule evaluation unit

What is claimed is:

1. An information processing apparatus comprising:
a memory having instructions stored therein;
at least one processor configured to execute the instructions, that when executed implement:
an input unit that receives observation represented by a conjunction of atomic formulas, background knowledge represented by a set of logic formulas, and condition to be satisfied by a new rule represented by a logic formula,
a rule candidate generation unit that generates the new rule represented by a logic formula having a predicate, which is contained in the observation or the background knowledge, as an element,
an abduction system unit that executes abduction to derive best hypothesis by using the background knowledge, to which the new rule generated is added, and the observation as inputs,

a rule evaluation unit that evaluates whether the new rule satisfies the condition to be satisfied by using the best hypothesis,
a hypothesis graph holding unit that holds a hypothesis graph generated prior to execution of abduction by the abduction system unit, the hypothesis graph having a graph which represents a set of possible hypotheses and has a node corresponding to a predicate, and
a rule pruning unit that determines to skip abduction to be executed with the background knowledge, to which the new rule is added, and the observation as inputs, by using a prior hypothesis graph generated when abduction is executed with the background knowledge, to which a rule having fewer logic formulas of conjunction than the new rule is added, and the observation as inputs.

2. The information processing apparatus according to claim 1, wherein
the rule pruning unit determines to skip abduction when a set of predicates, which are nodes contained in the prior hypothesis graph, does not contain a predicate that appears in a consequent of the new rule.

3. The information processing apparatus according to claim 1, wherein
the rule pruning unit determines to skip abduction when an evaluation result, evaluated by the rule evaluation unit using a best result derived based on the prior hypothesis graph, does not satisfy the condition and the logic formula of conjunction does not have a potential to be unified with any of the nodes of the prior hypothesis graph.

4. An information processing method comprising:
receiving observation represented by a conjunction of atomic formulas, background knowledge represented by a set of logic formulas, and condition to be satisfied by a new rule represented by a logic formula,
generating the new rule represented by a logic formula having a predicate, which is contained in the observation or the background knowledge, as an element,
executing abduction to derive best hypothesis by using the background knowledge, to which the new rule generated is added, and the observation as inputs,
evaluating whether the new rule satisfies the condition to be satisfied by using the best hypothesis,
holding a hypothesis graph generated prior to execution of abduction, the hypothesis graph having a graph which represents a set of possible hypotheses and has a node corresponding to a predicate, and
determining to skip abduction to be executed with the background knowledge, to which the new rule is added, and the observation as inputs, by using a prior hypothesis graph generated when abduction is executed with the background knowledge, to which a rule having fewer logic formulas of conjunction than the new rule is added, and the observation as inputs.

5. The information processing method according to claim 4, wherein
when determining to skip abduction:
determining to skip abduction when a set of predicates, which are nodes contained in the prior hypothesis graph, does not contain a predicate that appears in a consequent of the new rule.

6. The information processing method according to claim 4, wherein
when determining to skip abduction:
determining to skip abduction when an evaluation result, evaluated using a best result derived based on the prior hypothesis graph, does not satisfy the condition and the logic formula of conjunction does not have a potential to be unified with any of the nodes of the prior hypothesis graph.

7. A non-transitory computer-readable recording medium that includes a program recorded thereon, the program including instructions that cause a computer to execute:

receiving observation represented by a conjunction of atomic formulas, background knowledge represented by a set of logic formulas, and condition to be satisfied by a new rule represented by a logic formula, generating the new rule represented by a logic formula having a predicate, which is contained in the observation or the background knowledge, as an element, executing abduction to derive best hypothesis by using the background knowledge, to which the new rule generated is added, and the observation as inputs, evaluating whether the new rule satisfies the condition to be satisfied by using the best hypothesis, holding a hypothesis graph generated prior to execution of abduction, the hypothesis graph having a graph which represents a set of possible hypotheses and has a node corresponding to a predicate, and determining to skip abduction to be executed with the background knowledge, to which the new rule is added, and the observation as inputs, by using a prior hypothesis graph generated when abduction is executed with the background knowledge, to which a rule having fewer logic formulas of conjunction than the new rule is added, and the observation as inputs.

8. The non-transitory computer-readable recording medium according to claim 7, wherein when determining to skip abduction:

determining to skip abduction when a set of predicates, which are nodes contained in the prior hypothesis graph, does not contain a predicate that appears in a consequent of the new rule.

9. The non-transitory computer-readable recording medium according to claim 7, wherein when determining to skip abduction:

determining to skip abduction when an evaluation result, evaluated using a best result derived based on the prior hypothesis graph, does not satisfy the condition and the logic formula of conjunction does not have a potential to be unified with any of the nodes of the prior hypothesis graph.

* * * * *